US006783625B2

(12) United States Patent
Plourde

(10) Patent No.: US 6,783,625 B2
(45) Date of Patent: Aug. 31, 2004

(54) TRANSVERSE DIRECTION ZIPPER END SEALER

(75) Inventor: Eric P. Plourde, Homewood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 201 days.

(21) Appl. No.: 09/991,400

(22) Filed: Nov. 21, 2001

(65) Prior Publication Data

US 2003/0094231 A1 May 22, 2003

(51) Int. Cl.[7] .................................................. B32B 31/20
(52) U.S. Cl. .................... 156/308.4; 156/290; 156/292; 53/139.2; 383/61.2; 383/63
(58) Field of Search .......................... 156/66, 290, 292, 156/308.4; 493/213; 53/133.4, 139.2

(56) References Cited

U.S. PATENT DOCUMENTS 6,017,412 A * 1/2000 Van Erden et al. ......... 156/290
6,511,406 B1 * 1/2003 Ohtsubo ..................... 493/214

* cited by examiner

*Primary Examiner*—Jeff H. Aftergut
*Assistant Examiner*—John L. Goff
(74) *Attorney, Agent, or Firm*—Pitney Hardin LLP

(57) ABSTRACT

An apparatus, device and method for producing end seals on a continuous supply of fastener strip having first and second interlocked profiles before the fastener strip is attached to a supply of thermoplastic film used to make a reclosable bag. The fastener strip is advanced through a guide. A first section is identified and fused thereby providing a first end seal. A second end section is identified with the identification based on the first end seal. The second section is fused, thereby providing a second end seal with the result of a length of fastener strip including a pair of end seals. A device is provided to simultaneously fuse and cut the fastener strip at the exiting end of the fastener guide.

4 Claims, 3 Drawing Sheets

TRANSVERSE DIRECTION ZIPPER END SEALER

FIELD OF THE INVENTION

The present invention relates to reclosable plastic bags. More specifically, the present invention relates to a method of producing plastic bags which are concurrently manufactured to include a fastener strip and the manner of producing such bags so that the ends of the fastener strip are fused, thereby providing end seals to the fastener strip prior to the fastener strip being attached to the thermoplastic film used to produce the plastic bag.

DESCRIPTION OF THE PRIOR ART

The present invention relates to improvements in the package making art and may be practiced in the manufacture of reclosable thermoplastic bags and packages of the kind that may be used for various consumer products. Such packages often include a form of peel-seal to render the pack moisture and/or airtight prior to the initial opening and/or a tamper-evident seal. A zipper means protects any remainder of the product therein after the initial opening.

The indicated art is fairly well developed but nevertheless remains open to improvements contributing to increased efficiency and cost-effectiveness. In the prior art, McMahon et al. (U.S. Pat. No. 4,909,017) discloses a method of making a form-fill bag having a reclosable fastener. Prior to entering the form-fill and seal machine, fastener strips are attached to the surface of the film transverse to the running direction at bag length intervals. The fastener strips contain pre-joined interlocked rib and groove strips and only one of the strips is attached to a top surface of the film with the other strip facing upwardly, or, in other words, inwardly toward the interior of the bag to be formed. The attached strips are secured at the center of the film and each strip is less than half of the film width. The film is then advanced to the form-fill and seal machine and drawn down over a forming collar and about the filling tube with the longitudinal side edge margins of the film brought together and seamed with a fin seal to form a tube. Cross seals are made across the tube to join the unattached fastener strip to form the closure and bottom of the bags.

A problem that is sometimes encountered by consumers when they open such bags is that the two zipper halves become separated at the zipper segment ends. This separation of the zipper halves makes it difficult for the consumers to align the zipper profiles to enable the bag to be reclosed. An improvement in the above method would be the ability to make end seals on the fastener strips prior to the attachment of the fastener strips on the thermoplastic film used to make the reclosable bag. The end seals serve to reinforce the ends of the zipper, thereby keeping the profiles aligned.

SUMMARY OF THE INVENTION

Accordingly, the present invention relates to an apparatus and method for producing end seals on a continuous supply of fastener strip having first and second interlocking profiles before the fastener strip is attached to a supply of thermoplastic film used to make a reclosable bag. In the method, the continuous supply of fastener strip is fed to and advanced through a guide. A first section of the continuous supply of fastener strip is identified and fused, thereby providing a first end seal. A second end section of the continuous supply of fastener strip is identified based on a measurement from the first end section. The second section is fused, thereby providing a second end seal with the result of a length of fastener strip including a pair of end seals. Prior to entering the bag making machine, the length of fastener strip is separated from the continuous supply fastener strip. The length of fastener strip is then attached to the surface of the thermoplastic film used to make the reclosable bag. In a second embodiment, the first and second sections are fused and simultaneously separated by a cutting device at the exiting end of the fastener guide.

DESCRIPTION OF THE DRAWINGS

Further objects and advantages of the invention will become apparent from the following description and claims and from the accompanying drawings, wherein:

DETAILED DESCRIPTION OF THE PREFERRED EMBODIMENT

Figure 1:
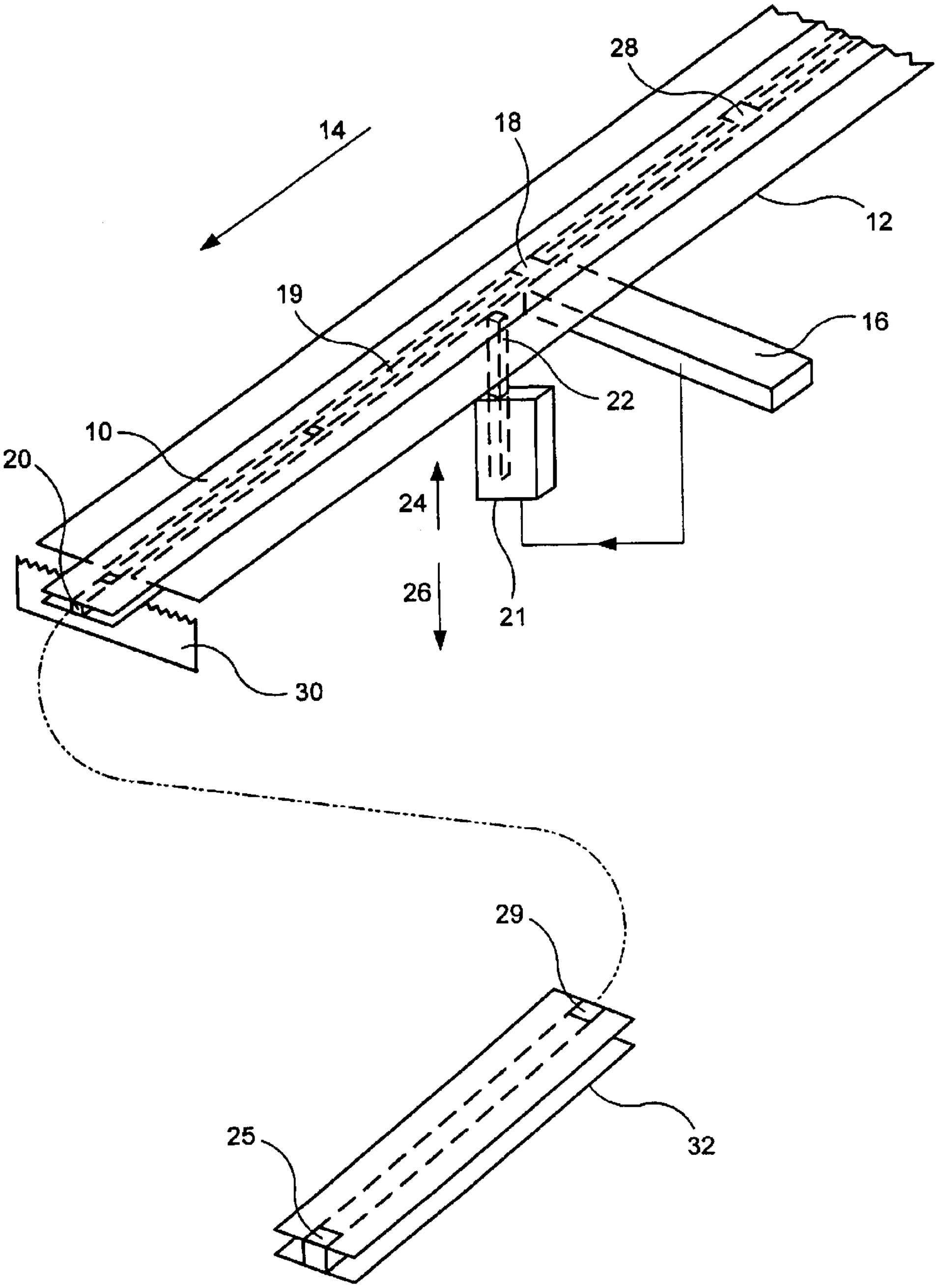
FIG. 1 is a perspective view of the fastener guide and heated blade of the present invention.

Referring now to the drawings in detail wherein like numerals indicate like elements throughout the several views, a continuous supply of fastener strip 10 is shown in FIG. 1 being advanced through a fastener guide 12 in movement direction 14 in a state prior to the fastener strip being fed to a bag making machine.

In the method, a sensing device 16 identifies a first end section 18 along a spine 19. The spine 19 is a backing portion of the fastener strip 10 that is colinear with the interlocking portion 20 of the fastener strip. The sensing device 16 may include a counter, an optical-activator or any other sensing medium known in the art. Upon identification, a signal is sent to blade activating mechanism 21. The blade activating mechanism moves a heated blade 22 in direction 24 toward the first end section 18. With the movement of the fastener strip stopped, the heated blade 22 fuses the first end section in direction 24 with the result of a first end seal 25 at the first end section. After fusing the first end section, the blade activating mechanism 21 retracts the heated blade 22 in direction 26 to an at-rest position.

The fastener strip 10 then proceeds in direction 14 until the sensing device 16 identifies a second end section 28. This identification can be based on a length or other inputted factors from the first end section 18. Upon identification, a signal is sent to the blade activating mechanism 21. The blade activating mechanism moves the heated blade 22 in direction 24 toward the second end section 28. With the movement of the fastener strip stopped, the heated blade 22 fuses the second end section in direction 24 with the result of a second end seal 29 at the second end section. After fusing the second end section, the blade activating mechanism 21 retracts the heated blade 22 in direction 26 to an at-rest position.

After production of the end seals, the supply of fastener strip 10 proceeds to a cutting device 30. The cutting device 30 separates a length 32 from the supply of fastener strip. The length 32 is separated adjacent to the first end seal 25 and then separated adjacent to the second end seal 29. The length 32 would then be attached to the thermoplastic film (not shown) used to make a reclosable bag.

Figure 2:
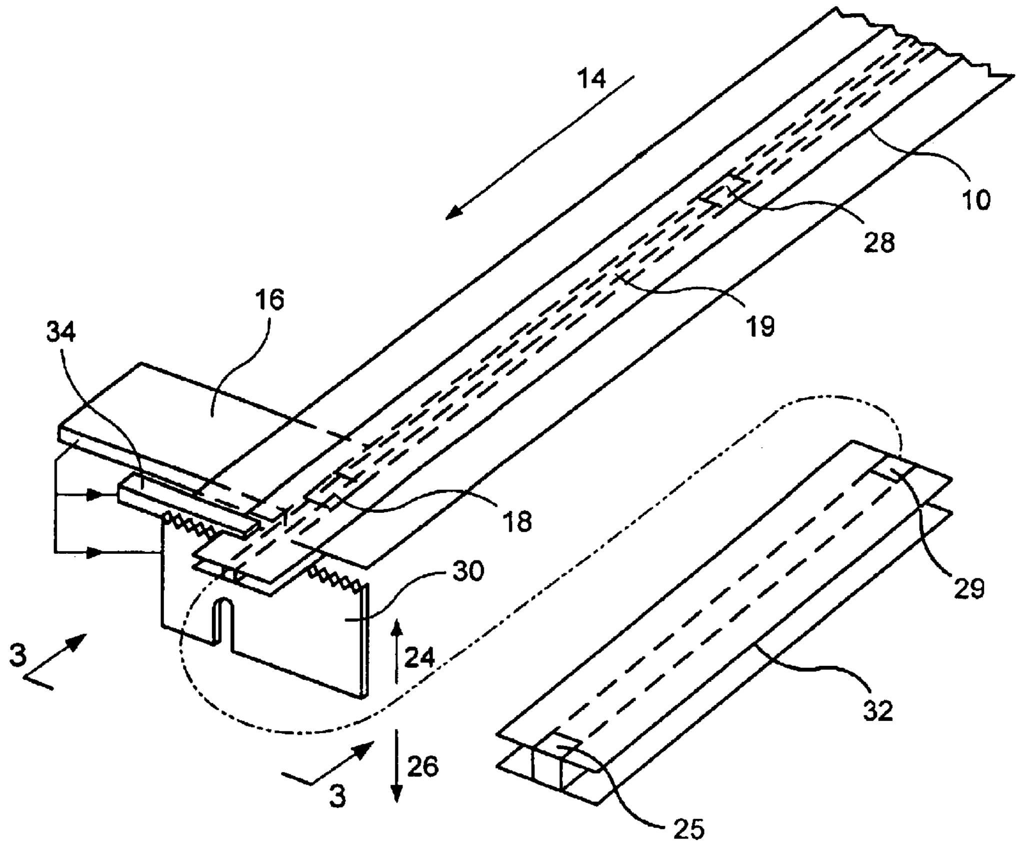
FIG. 2 is a perspective view of the fastener guide and fusing element in a second embodiment of the present invention.

FIG. 2 depicts a second embodiment of the present invention where the supply of fastener strip 10 is fused at the cutting device 30. In the method, a sensing device 16 identifies a first end section 18 along a spine 19. Upon identification, a signal is sent to the cutting device 30 and a spring-loaded clamp 34. The cutting device moves in direction 24 toward the first end section 18. The spring-loaded clamp 34 concurrently holds the fastener strip 10 in position and prevents the fastener strip from being pushed away from the cutting device 30. The spring-loaded clamp 34 can be situated either upstream or downstream of the cutting device 30 in relation to the movement of the fastener strip 10.

Figure 3:
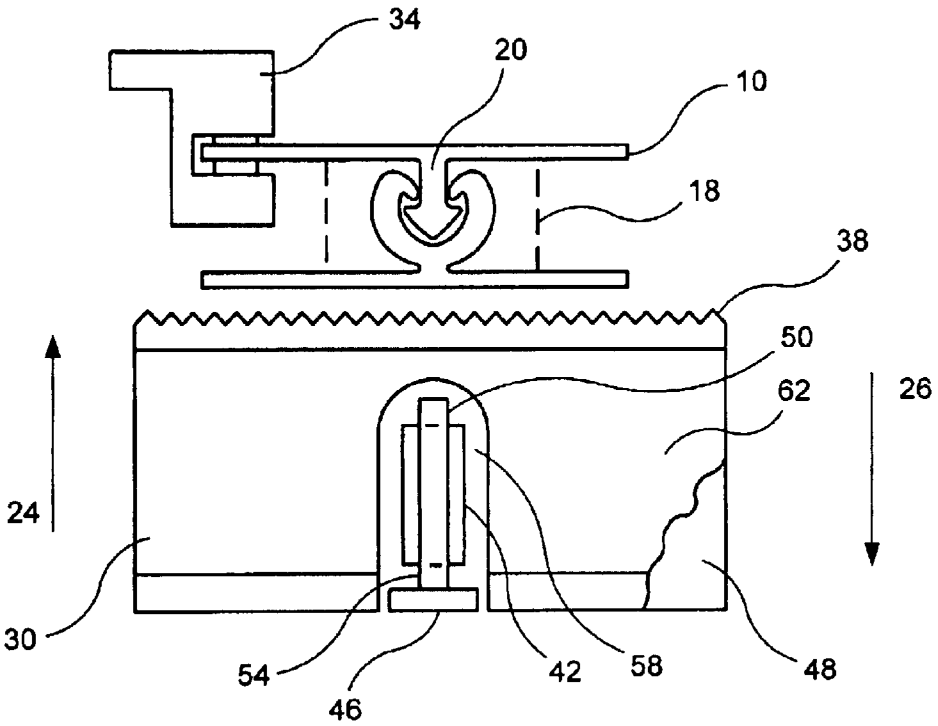
FIG. 3 is a sectional view depicting the second embodiment of the present invention taken from reference line 3—3 of FIG. 2.

As shown in FIG. 3, the cutting device 30 moves in direction 24. During this movement, serrated edge 38 would first encounter the fastener strip 10 following on with a heated element 42 of sealing blade 46. As the cutting device slices through the fastener strip 10, the side face of the heated element 42 aligned with a back portion 48 fuses interlocking portion 20 at the first end section 18 to provide a first end seal 25 (shown in FIG. 2). An upper clearance 50 and a lower clearance 54 are provided on the sealing blade 46 to prevent the heated element 42 from fusing the plastic when the cutting device 30 is fully extended in direction 24 or fully retracted in direction 26. Also, an insulating clearance 58, or material, is provided around the sealing blade 46 to prevent the remaining portions of the cutting device 30 from being heated. After fusing and completing a separation of the fastener strip 10 at the first end section, the cutting device 30 retracts in direction 26 to an at-rest position.

As depicted in FIG. 2, the fastener strip 10 then proceeds in direction 14 until the sensing device 16 identifies a second end section 28. This identification can be based on a length from the first end section 18 or other inputted factors. Upon identification, a signal is sent to the cutting device 30 and the spring-loaded clamp 34. The cutting device moves in direction 24 toward the second end section 28. The spring-loaded clamp 34 concurrently holds the fastener strip 10 in position.

As depicted in FIG. 3, the cutting device 30 moves in direction 24. The serrated edge 38 would first encounter the fastener strip following on with the heated element 42 of the sealing blade 46. As the cutting device slices through the fastener strip 10, the side face of the heated element aligned with a front portion 62 fuses interlocking portion 20 at the second end section 28 to provide a second end seal 29 (shown in FIG. 2). After fusing and completing a separation of the fastener strip 10 at the second end section, the cutting device 30 retracts in direction 26 to an at-rest position. By separating at the second end section, the cutting device 30 separates a length 32 from the continuous supply of fastener strip. The length 32 would then be attached to a supply of the thermoplastic film used to make a reclosable bag.

Thus, the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method for producing end seals on a continuous supply of fastener strip for subsequent attachment to a thermoplastic web in a bag making machine, said method comprising the steps of:

providing said continuous supply of fastener strip, said fastener strip including first and second interlocking profiles with said profiles interlocked along an interlocking length;

advancing said continuous supply of fastener strip within a guide;

identifying a first end section of said continuous supply of fastener strip, said first end section consisting essentially of an interlocked first portion of said fastener strip;

fusing only the first end section such that a first of the end seals is provided;

identifying a second end section of said continuous supply of fastener strip with said identification based on a measurement from said first end section, said second end section consisting essentially of an interlocked second portion of said fastener strip; and fusing only the second end section such that a second of the end seals is provided thereby creating a length of said continuous supply of fastener strip for subsequent attachment to said thermoplastic web said length including said first and said second end seals.

2. The method in accordance with claim 1, wherein said first and second end sections are disposed only on said interlocking length.

3. The method in accordance with claim 2, further including the steps of clamping the continuous supply of fastener strip, said step of clamping occurring during the fusing of said first and second end sections.

4. The method in accordance with claim 3, further including the step of separating said length from said continuous supply of fastener strip.

* * * * *